(12) United States Patent
Chiu et al.

(10) Patent No.: US 7,682,574 B2
(45) Date of Patent: Mar. 23, 2010

(54) SAFETY, MONITORING AND CONTROL FEATURES FOR THERMAL ABATEMENT REACTOR

(75) Inventors: Ho-Man Rodney Chiu, San Jose, CA (US); Daniel O. Clark, Pleasanton, CA (US); Shaun W. Crawford, San Ramon, CA (US); Jay J. Jung, Sunnyvale, CA (US); Youssef A. Loldj, Sunnyvale, CA (US); Robbert Vermeulen, Pleasant Hill, CA (US)

(73) Assignee: Applied Materials, Inc., Santa Clara, CA (US)

( * ) Notice: Subject to any disclaimer, the term of this patent is extended or adjusted under 35 U.S.C. 154(b) by 1018 days.

(21) Appl. No.: 10/991,740

(22) Filed: Nov. 18, 2004

(65) Prior Publication Data

US 2006/0104878 A1  May 18, 2006

(51) Int. Cl.
*B01J 19/00* (2006.01)

(52) U.S. Cl. .............. 422/108; 422/116; 422/172; 422/176; 422/210; 422/235

(58) Field of Classification Search .......... 423/210, 423/235; 422/172, 176, 108, 116, 190, 211, 422/223, 255; 431/31, 43; 261/75; 96/243
See application file for complete search history.

(56) References Cited

U.S. PATENT DOCUMENTS

| | | | | |
|---|---|---|---|---|
| 3,185,846 A | * | 5/1965 | Gilbert et al. | 250/372 |
| 3,276,506 A | | 10/1966 | Micko | |
| 3,299,416 A | | 1/1967 | Koppel | |
| 3,698,696 A | * | 10/1972 | Rauskolb | 432/49 |
| 4,059,386 A | * | 11/1977 | Eising | 431/43 |
| 4,087,229 A | | 5/1978 | Teichert et al. | |
| 4,243,372 A | * | 1/1981 | Cade | 431/31 |
| 4,280,184 A | | 7/1981 | Weiner et al. | |
| 4,373,897 A | | 2/1983 | Torborg | |
| 4,392,821 A | | 7/1983 | Füssl et al. | |
| 4,443,793 A | | 4/1984 | Hall, Jr. | |
| 4,482,312 A | * | 11/1984 | Cade | 431/31 |
| 4,483,672 A | * | 11/1984 | Wallace et al. | 431/20 |
| 4,555,389 A | | 11/1985 | Soneta et al. | |

(Continued)

FOREIGN PATENT DOCUMENTS

EP        044 670 A        1/1982

(Continued)

OTHER PUBLICATIONS

U.S. Appl. No. 12,257,888, filed Oct. 24, 2008.

(Continued)

*Primary Examiner*—N. Bhat
(74) *Attorney, Agent, or Firm*—Dugan & Dugan, PC

(57) ABSTRACT

The present invention relates to a thermal reactor apparatus used to treat industrial effluent fluids, for example waste effluent produced in semiconductor and liquid crystal display manufacturing processes. Specifically, the present invention relates to improved monitoring and control features for the thermal reactor apparatus, including a flame sensing device, an intrinsically safe flammable gas sensing device, and a sequential mode of operation having built-in safety redundancy. The improved monitoring and control features ensure the safe and efficient abatement of waste effluent within the thermal reactor apparatus.

35 Claims, 12 Drawing Sheets

U.S. PATENT DOCUMENTS

| | | | |
|---|---|---|---|
| 4,828,484 | A | 5/1989 | Youtz |
| 4,981,722 | A | 1/1991 | Moller et al. |
| 5,123,836 | A | 6/1992 | Yoneda et al. |
| 5,264,708 | A | 11/1993 | Hijikata |
| 5,362,458 | A | 11/1994 | Saleem et al. |
| 5,419,358 | A * | 5/1995 | Sun .......................... 137/78.4 |
| 5,510,093 | A | 4/1996 | Bartz et al. |
| 5,603,905 | A | 2/1997 | Bartz et al. |
| 5,649,985 | A | 7/1997 | Imamura |
| 5,749,720 | A | 5/1998 | Fukuda et al. |
| 5,833,888 | A | 11/1998 | Arya et al. |
| 5,935,283 | A | 8/1999 | Sweeney et al. |
| 5,938,422 | A | 8/1999 | Smith et al. |
| 5,957,678 | A | 9/1999 | Endoh et al. |
| 6,010,576 | A | 1/2000 | Lin |
| 6,187,080 | B1 | 2/2001 | Ping-Chung et al. |
| 6,234,787 | B1 | 5/2001 | Endoh et al. |
| 6,261,524 | B1 | 7/2001 | Herman et al. |
| 6,322,756 | B1 | 11/2001 | Arno et al. |
| 6,345,768 | B1 * | 2/2002 | Inagaki et al. ............. 236/15 A |
| 6,419,455 | B1 | 7/2002 | Rousseau et al. |
| 6,511,641 | B2 | 1/2003 | Herman et al. |
| 6,676,913 | B2 | 1/2004 | Rossin |
| 6,712,603 | B2 | 3/2004 | Pettit |
| 6,752,974 | B2 | 6/2004 | Dunwoody et al. |
| 6,875,007 | B2 | 4/2005 | Pettit |
| 6,969,250 | B1 | 11/2005 | Kawamura et al. |
| 6,988,017 | B2 | 1/2006 | Pasadyn et al. |
| 7,001,527 | B2 | 2/2006 | Stever et al. |
| 7,057,182 | B2 | 6/2006 | Kitchin et al. |
| 7,058,470 | B2 | 6/2006 | Tanaka et al. |
| 7,160,521 | B2 | 1/2007 | Porshnev et al. |
| 7,194,369 | B2 | 3/2007 | Lundstedt et al. |
| 7,316,721 | B1 | 1/2008 | Redden et al. |
| 2003/0189967 | A1 | 10/2003 | Rumelin et al. |
| 2004/0161718 | A1 | 8/2004 | Pettit |
| 2004/0188360 | A1 | 9/2004 | Armstrong et al. |
| 2004/0213721 | A1 | 10/2004 | Arno et al. |
| 2006/0104879 | A1 | 5/2006 | Chiu et al. |
| 2007/0166205 | A1 | 7/2007 | Holst et al. |
| 2007/0274876 | A1 | 11/2007 | Chiu et al. |

FOREIGN PATENT DOCUMENTS

| | | | |
|---|---|---|---|
| EP | 0 694 735 | A1 | 1/1996 |
| EP | 0 752 557 | A | 1/1997 |
| EP | 0 802 370 | A2 | 10/1997 |
| EP | 0 809 071 | A1 | 11/1997 |
| EP | 916388 | A2 | 5/1999 |
| EP | 0 919 773 | * | 6/1999 |
| EP | 0 919 773 | A1 | 6/1999 |
| EP | 1 143 197 | A1 | 10/2001 |
| EP | 1 431 657 | A1 | 6/2004 |
| FR | 2 062 565 | | 6/1971 |
| GB | 2 028 998 | A | 3/1980 |
| GB | 2 036 384 | A | 6/1980 |
| GB | 2 183 023 | A | 5/1987 |
| JP | 02 225905 | | 9/1990 |
| JP | 06 313532 | A | 11/1994 |
| JP | 09 133333 | A | 5/1997 |
| JP | 2001082723 | A | 3/2001 |
| WO | WO 97/45677 | A | 12/1997 |
| WO | WO98/29181 | A1 | 7/1998 |
| WO | WO 2006/083356 | | 8/2006 |

OTHER PUBLICATIONS

U.S. Appl. No. 60/982,391, filed on Oct. 24, 2007.
U.S. Appl. No. 60/982,393, filed on Oct. 24, 2007.
International Search Report and Written Opinion of International Application No. PCT/US05/042201 dated Jan. 28, 2009.
International Search Report dated Jul. 27, 2006, relating to International Application No. PCT/US05/042201.
Fireye CU-20 "Documentation for 45UV5 and 255U3" May 1994, pp. 1-7.
International Search Report and Written Opinion of International Application No. PCT/US2008/081098 mailed Dec. 29, 2008.
U.S. Office Action issued Nov. 10, 2008 in U.S. Appl. No. 11/410,882.
International Search Report and Written Opinion dated Jul. 15, 2008, relating to International Application No. PCT/US07/06495.
International Search Report and Written Opinion dated Nov. 19, 2008, relating to International Application No. PCT/US08/74937.
International Search Report and Written Opinion dated Nov. 28, 2008, relating to International Application No. PCT/US08/77082.
U.S. Office Action issued Mar. 25, 2008 in U.S. Appl. No. 11/555,087.
U.S. Office Action issued Apr. 4, 2008 in U.S. Appl. No. 10/987,921.
Partial International Search Report dated Jul. 27, 2006, relating to International Application No. PCT/US05/042201.

* cited by examiner

SAFETY, MONITORING AND CONTROL FEATURES FOR THERMAL ABATEMENT REACTOR

BACKGROUND OF THE INVENTION

1. Field of the Invention

The present invention relates to a thermal reactor apparatus used to treat industrial effluent fluids, for example effluent gases produced in semiconductor and liquid crystal display manufacturing processes. Specifically, the present invention relates to improved safety, reliability, monitoring and control features and components for said thermal reactor apparatus.

2. Description of the Related Art

The gaseous effluents from the manufacturing of semiconductor materials, devices, products and memory articles involve a wide variety of chemical compounds used and produced in the process facility. These compounds include inorganic and organic compounds, oxidizers, breakdown products of photo-resist and other reagents, and a wide variety of other gases and suspended particulates that must be removed from the effluent streams before being vented from the process facility into the atmosphere.

Semiconductor manufacturing processes utilize a variety of chemicals, many of which have extremely low human tolerance levels. Such materials include, but are not limited to: gaseous hydrides of antimony, arsenic, boron, germanium, nitrogen, phosphorous, silicon, and selenium; silane; silane mixtures; hydrogen; organosilanes; halosilanes; halogens; acid gases; organometallics; oxidizers such as $O_3$, $NF_3$ and $ClF_3$; and other organic compounds such as alcohols.

A significant problem of the semiconductor industry has been the consistent and effective removal of these materials from the effluent streams. While virtually all U.S. semiconductor manufacturing facilities utilize scrubbers or similar means for treatment of their effluent streams, the technology employed in these facilities is subject to failure and inefficiencies and as such, not all toxic or otherwise unacceptable impurities are removed.

Point-of-use abatement systems add a level of redundancy, reliability, and capability by removing pollutants from an effluent stream before the effluent is diluted in a house scrubber system. Combining and diluting effluent streams in the house system is disadvantageous for several reasons including, but not limited to, decreasing abatement efficiency due to the large, diluted volumes that must be treated, and increasing risk of unwanted side reactions, particle formation, and corrosion in a house scrubber duct system. Further, failures of the house scrubbing technology present substantial safety hazards to the personnel, facility, and the environment. The, point-of-use abatement systems combined with the house scrubbing system adds a level of redundancy and reliability consistent with critical safety standards practices of the semiconductor manufacturing industry.

Thermal reactors are increasingly being used to process effluent waste streams to decompose the toxic materials, converting them to less toxic forms. For example, the improved thermal reaction unit disclosed in co-pending U.S. patent application Ser. No. 10/987,921, filed Nov. 12, 2004 in the name of Ho-Man Rodney Chiu et al., and entitled "Reactor Design to Reduce Particle Deposition During Process Abatement,"abates at least 95%, preferably at least 99%, of waste effluent components including, but not limited to, $CF_4$, $C_2F_6$, $SF_6$, $C_3F_8$, $C_4F_8$, $C_4F_8O$, $SiF_4$, $BF_3$, $BH_3$, $B_2H_6$, $B_5H_9$, $NH_3$, $PH_3$, $SiH_4$, $SeH_2$, $F_2$, $Cl_2$, $HCl$, $HF$, $HBr$, $WF_6$, $H_2$, $Al(CH_3)_3$, alcohols, oxidizers such as $O_3$, $NF_3$ and $ClF_3$, primary and secondary amines, acid gases, organosilanes, organometallics, and halosilanes. Importantly, the decomposition removal efficiency (DRE) of the improved thermal reaction unit is greater than 99% and it is designed to reduce the deposition of unwanted reaction products, such as silicon oxides, within the thermal reaction unit.

As the art of thermal abatement develops, so has the necessity for developing safety, reliability, monitoring and control features for said thermal reactors. Safety features are especially important because the abatement of effluent waste streams in thermal reactors is facilitated by the introduction of fuels, e.g., methane, natural gas and/or hydrogen, to the thermal reactors for combustion and oxidation therein. The high temperature generated by the combustion of said fuels assists in decomposing the toxic materials of the effluent stream therein. Clearly, monitoring and control components are necessary to minimize the risk of ignition and deflagration within the reactor or reactor housing due to fuel leaks, as well as making sure the reactor efficiently abates the effluent waste stream.

Accordingly, it would be advantageous to provide improved safety, monitoring and control features for thermal reactors to ensure personnel safety and improve the efficiency of the abatement process.

SUMMARY OF INVENTION

The present invention relates to improved safety, monitoring and control features for thermal reactors and other abatement processes.

In one aspect, the present invention relates to an apparatus for removing pollutant from waste effluent, said apparatus comprising:

(a) a thermal reactor having a thermal reaction chamber;
(b) at least one fuel inlet in fluid communication with the thermal reaction chamber for introducing a fuel gas therein;
(c) a pilot flame device positioned at or within the thermal reaction chamber;
(d) at least one burner jet positioned at or within the thermal reaction chamber, wherein the at least one fuel inlet is in fluid communication with the at least one burner jet;
(e) at least one waste effluent inlet in fluid communication with the thermal reaction chamber for introducing a waste effluent thereto;
(f) a controller; and
(g) at least one additional component selected from the group consisting of a flame sensor, a flammable gas sensor, and a fuel booster.

In yet another aspect, the present invention relates to method for sequentially operating the start-up of a thermal reactor having a thermal reaction chamber, said method comprising:

(a) verifying the operability of at least one alarm means;
(b) checking a volume of recirculation water in a water circulation tank positioned downstream of the thermal reaction chamber, wherein the volume of recirculation water is between a minimum volume and a maximum volume;
(c) measuring temperature in a headspace of the water circulation tank, wherein the temperature must be below a threshold temperature prior to start-up;
(d) purging the thermal reaction chamber with an inert gas for sufficient time to substantially remove flammable species that may be present therein;
(e) igniting a pilot flame device positioned at or within the thermal reaction chamber;
(f) flowing fuel into the thermal reaction chamber;

(g) igniting the fuel flowing into the thermal reaction chamber;

(h) verifying that the pilot flame device has ignited the fuel flowing into the thermal reaction chamber; and (i) flowing a waste effluent into the thermal reaction chamber for at least partial decomposition therein, wherein the thermal reactor safely and effectively removes pollutants from the waste effluent.

Other aspects and advantages of the invention will be more fully apparent from the ensuing disclosure and appended claims

DETAILED DESCRIPTION OF PREFERRED EMBODIMENT OF THE INVENTION

The present invention relates generally to a thermal reactor apparatus used to efficiently and controllably decompose pollutants contained in effluent streams. More specifically, the present invention relates to improved safety, monitoring and control features for said thermal reactor apparatus to ensure personnel safety and improve the efficiency of abatement processes.

U.S. patent application Ser. No. 10/987,921, filed Nov. 12, 2004 in the names of Ho-Man Rodney Chiu, Daniel O. Clark, Shaun W. Crawford, Jay J. Jung, Leonard B. Todd and Robbert Vermeulen, entitled "Reactor Design to Reduce Particle Deposition During Process Abatement," is hereby incorporated by reference herein in its entirety.

Effluent streams to be abated may include species generated by a semiconductor process and/or species that were delivered to and egressed from the semiconductor process without chemical alteration. As used herein, the term "semiconductor process" is intended to be broadly construed to include any and all processing and unit operations in the manufacture of semiconductor products and/or LCD products, as well as all operations involving treatment or processing of materials used in or produced by a semiconductor and/or LCD manufacturing facility, as well as all operations carried out in connection with the semiconductor and/or LCD manufacturing facility not involving active manufacturing (examples include conditioning of process equipment, purging of chemical delivery lines in preparation of operation, etch cleaning of process tool chambers, abatement of toxic or hazardous gases from effluents produced by the semiconductor and/or LCD manufacturing facility, etc.). As used herein, "effluent streams" and "waste streams" are intended to be synonymous terms.

Figure 1:
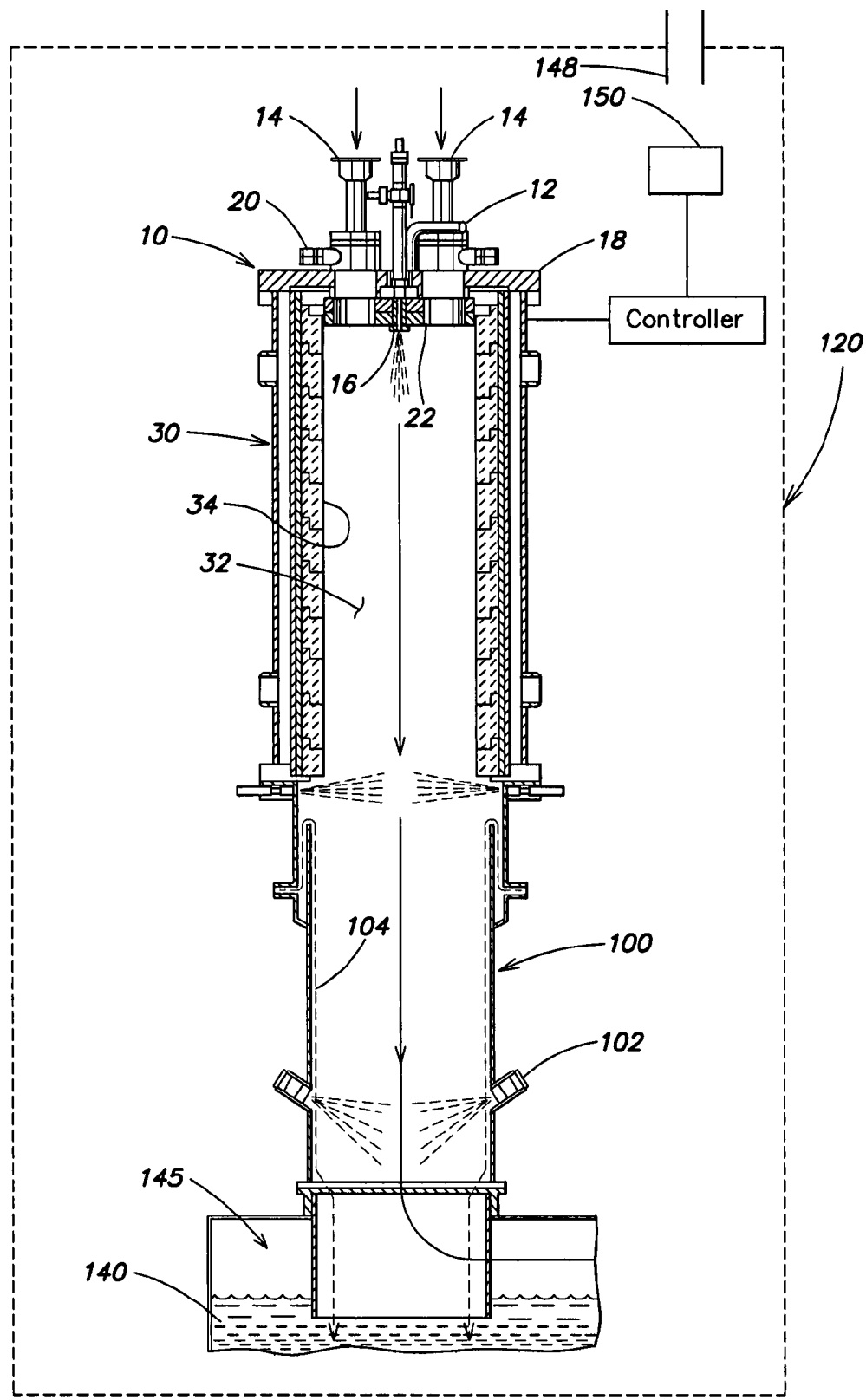
FIG. 1 is a cut away view of the thermal reaction unit, the inlet adaptor and the lower chamber according to the invention.

A generalized thermal reactor having a thermal reaction unit 30 and a lower quenching chamber 100 is shown in FIG. 1. The thermal reaction unit 30 includes thermal reactor walls 34 defining a thermal reaction chamber 32, and an inlet adaptor 10, including a top plate 18, at least one waste stream inlet 14, at least one fuel inlet 20, burner jets 22, a pilot 16, and optionally at least one oxidant inlet 12. The inlet adaptor includes the fuel and oxidant gas inlets to provide a fuel rich gas mixture to the system for the destruction of pollutants contained in the waste stream. In a preferred embodiment, the thermal reactor walls 34 are constructed from a reticulated ceramic material, such as yttria-doped alumina. Preferably, the fuel used includes natural gas.

In practice, waste streams enter the thermal reaction chamber 32 from at least one waste stream inlet provided in the inlet adaptor 10, and the fuel/oxidant mixture enters the thermal reaction chamber 32 from at least one burner jet 22. The pilot 16 includes a pilot flame which is used to ignite the burner jets 22 of the inlet adaptor, creating thermal reaction unit temperatures in a range from about 500° C. to about 2000° C. The high temperatures facilitate decomposition of the pollutants contained in the waste streams that enter the thermal reaction chamber 32.

Following decomposition/combustion, the effluent gases pass to the lower chamber 100 wherein a water curtain 104 may be used to cool the walls of the lower chamber and inhibit deposition of particulate matter thereon. Further downstream of the water curtain, a water spraying means 102 may be positioned within the lower chamber 100 to cool the gas stream and remove the particulate matter and water soluble or reactive gases. Gases passing through the lower chamber may be released to the atmosphere or alternatively may be directed to additional treatment units including, but not limited to, liquid/liquid scrubbing, physical and/or chemical adsorption, coal traps, electrostatic precipitators, and cyclones.

During combustion start-up, a low flow of fuel, e.g., flowing at a rate of 5-8 slm, is ignited at the pilot 16. Following successful ignition of the pilot, the fuel flow is opened to the burner jets 22 at a flow of about 30-90 slm to generate the high temperatures necessary to decompose species such as $CF_4$. Unfortunately, if the pilot does not ignite during start-up and this failure goes unnoticed, the increase in fuel flow to the burner jets concomitantly increases the risk of deflagration in the thermal reactor.

Figure 2:
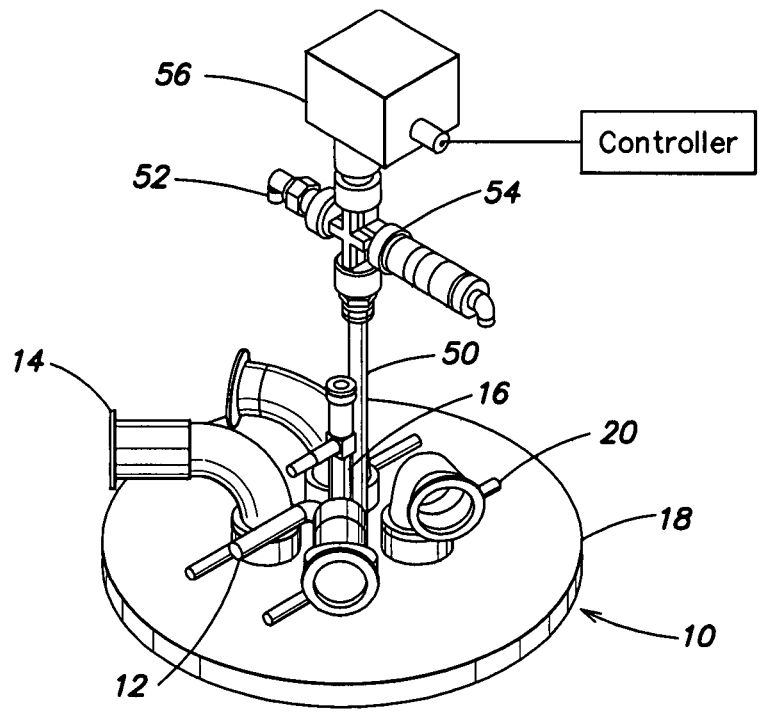
FIG. 2 is a three-dimensional view of the inlet adaptor and the flame sensor according to the invention.
Figure 3:
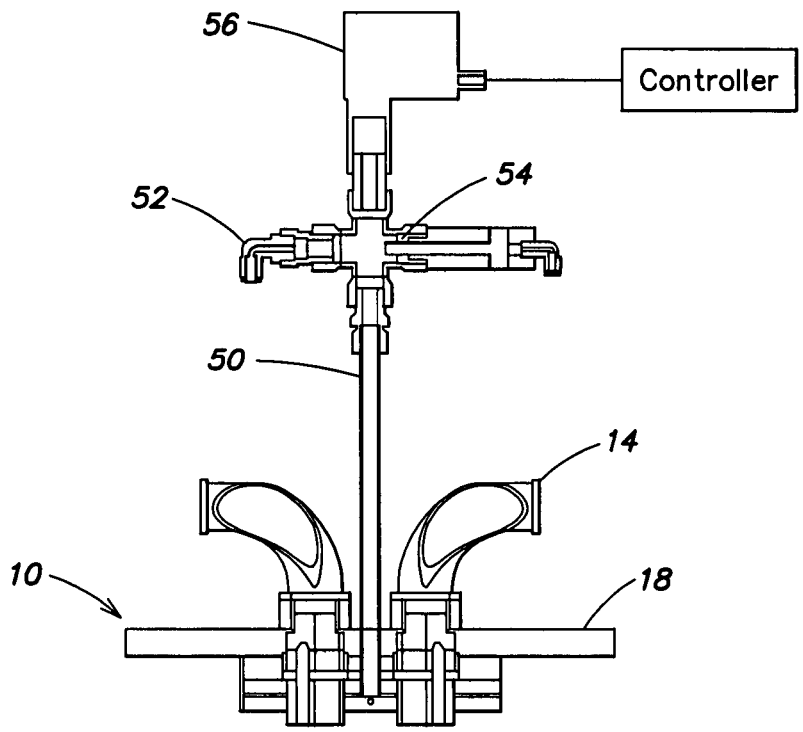
FIG. 3 is a cut away view of the inlet adaptor and the flame sensor according to the invention.

In one embodiment of the present invention, the ignition and combustion processes are monitored using a flame sensor, which may be incorporated into the inlet adaptor. Referring to FIGS. 2 and 3, a radiation conduit 50 is positioned to pass through the top plate 18 whereby the bottom end of the radiation conduit 50 is located within the thermal reaction chamber and facing the flame of the pilot 16. The radiation conduit 50 is preferably in fluid communication with the thermal reaction chamber so that a purge gas, e.g., as introduced at a purge gas inlet 52, may flow continuously down the radiation conduit 50 to reduce particulate clogging and back diffusion within and/or at the bottom end of the conduit. The purge gas may include clean dry air (CDA), air, nitrogen or argon. It is to be appreciated by one skilled in the art that the structure and construction of the flame sensor apparatus described herein may be readily modified for use in any system where a flame needs to be sensed.

A radiation sensor 56 is positioned to radiatively communicate with the thermal reaction chamber via the radiation conduit 50. As defined herein, "radiative communication" means that radiation from the thermal reaction chamber is able to be detected by the radiation sensor. The radiation sensor is hermetically sealed and mechanically resilient and includes a radiation cell with a quartz or sapphire lens, a lamp with lamp power supply and a detector assembly. The lens isolates the detector from the hot reactor atmosphere. The spectral range for the radiation sensor preferably corresponds to the ultraviolet range and may be in a range from about 10 nm to about 400 nm, preferably in a range from about 190 nm to about 320 nm. It is understood by one skilled in the art that the radiation sensor may employ a different spectral range depending on the fuel used in the thermal reactor. For example, when the fuel is natural gas, the emission of interest is the OH* emission, corresponding to $\lambda=309$ nm (see, Timmerman, B. H., Bryanston-Cross, P. J., Dunkley, P., *The 16$^{th}$ Symposium on Measuring Techniques in Transonic and Supersonic Flow in Cascades and Turbomachines*, Cambridge, UK, September 2002, pp. 1-7). An example of a suitable radiation sensor is the UVS 6, manufactured by Kromschroder, Inc. (Hudson, Ohio).

The radiation sensor may be communicatively connected with a controller, which monitors the input from the radiation sensor and in response, generates outputs to the various components (to be discussed in more detail hereinafter).

Figure 4A:
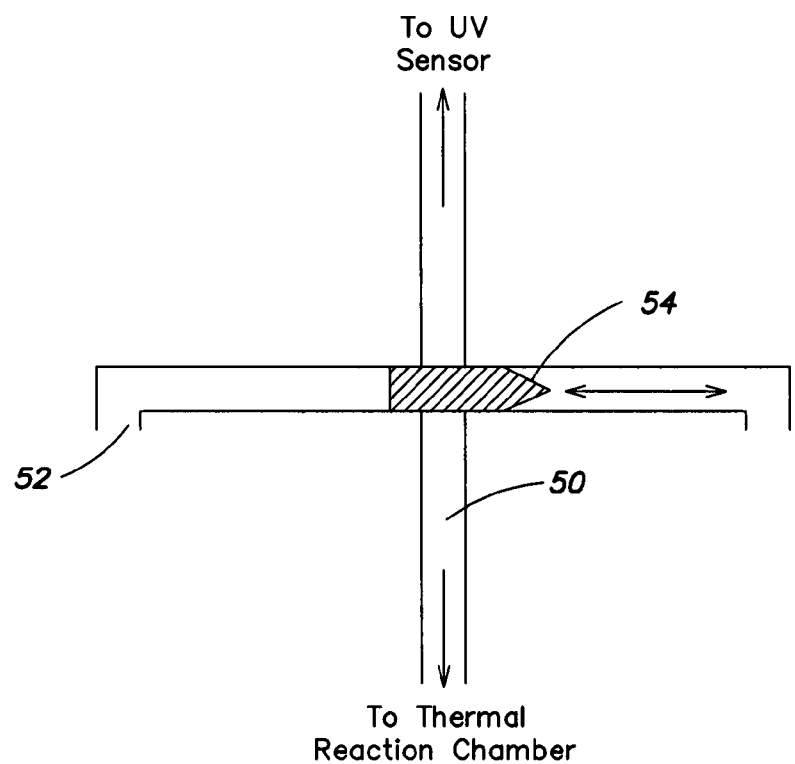
FIG. 4A is a cut away view of the actuator of the flame sensor according to the invention, wherein the actuator is closed.
Figure 4B:
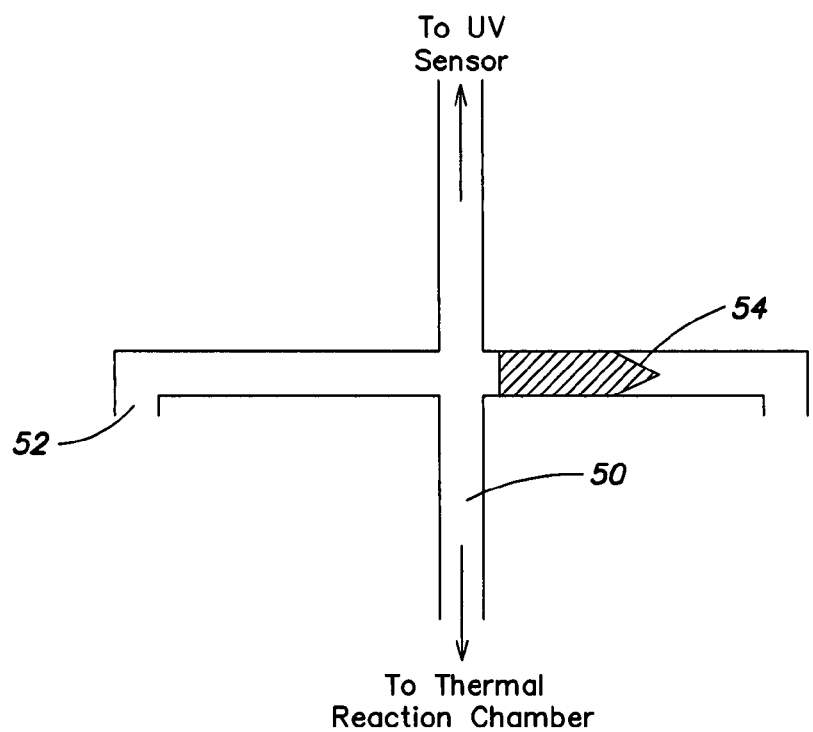
FIG. 4B is a cut away view of the actuator of the flame sensor according to the invention, wherein the actuator is open.

To ensure that the radiation sensor 56 does not detect false readings, an actuator 54 may be incorporated into the flame sensor apparatus. The actuator provides a self-check to determine if the radiation sensor 56 is operating correctly. In operation, when the actuator 54 is closed (see FIG. 4A), the radiation from the thermal reaction chamber is blocked from passing through to the radiation sensor 56, which should detect that the flame signal has been lost. Thereafter, the actuator is reopened (see FIG. 4B) and the radiation from the thermal reaction chamber will pass through to the radiation sensor 56, which should detect that the flame signal is on again. The timing of the actuator closed-actuator open cycle may be readily determined by one skilled in the art. Preferably, the actuator is open for about 30 seconds and closed for about 3 to about 5 seconds, said cycle occurring continuously throughout the start-up and operation of the thermal reactor.

During start-up, the flame sensor is on-line to sense the presence of a radiation-producing flame within the thermal reaction chamber, said flame verifying that the pilot has been successfully ignited. If the flame is detected, the fuel-flow to the burner jets may be started. If no radiation-producing flame is detected during start-up, the controller should activate an alarm and halt fuel flow to minimize the risk of deflagration within the reactor.

In addition to the importance of sensing the flame at start-up, the flame sensor should be operated throughout the abatement process to ensure the flame has not been inadvertently extinguished. Similar to start-up, if the flame sensor detects that the flame has been lost (at some time other than during the actuated self-check), the controller should activate the alarm and halt fuel flow to minimize the risk of deflagration within the reactor.

In another embodiment of the present invention, an intrinsically safe flammable gas sensor may be operated exteriorly and proximately to the thermal reactor and in close proximity to the main enclosure vent. Referring to FIG. 1, the thermal reactor and the flammable gas sensor are preferably positioned within a main enclosure 120, wherein the flammable gas sensor 150 is positioned exteriorly and proximately to the thermal reactor and in close proximity to the main enclosure vent 148.

In general, a main enclosure 120 includes an electrical enclosure 125 and a exhausted enclosure 122. The electrical enclosure is isolated from the exhausted enclosure and is continuously purged with $N_2$, making it substantially impervious to flammable gases. In contrast, the exhausted enclosure, which is where the thermal reactor, the fuel panel and other devices are installed, corresponds to the location within the main enclosure where flammable gases would be readily detected and reactable in the event of a fuel leak. "Substantially impervious," as defined herein means that less than 0.1%, preferably less than 0.05%, of available flammable gas molecules are detectable in the specified region.

Within the exhausted enclosure 122 are numerous components which use electrical energy for operation, the energy of said components exceeding the minimum amount of energy needed to ignite gaseous constituents that may be present. As such, it is imperative that a flammable gas sensor be positioned within the exhausted enclosure to detect fuel leaks and remove all possible sources of ignition (electrical energy) when a leak is detected.

Unfortunately, flammable gas sensors of the prior art use substantial quantities of electrical energy, i.e., they may be the source of ignition if a gas leak occurs. Additionally, presently marketed sensors designed for use in hazardous environments are bulky and expensive. Therefore, it would be a significant advance in the art to provide an improved flammable gas sensor that has a small footprint, is affordable and is a low energy, intrinsically safe sensor.

As defined herein, "low energy sensor" relates to sensing devices that utilize an energy input which can be provided by an intrinsically safe barrier, and can be maintained below the ignition energy of the fuel used. As defined herein, "intrinsically safe" relates to a power limit rating for electronics used in an explosive or flammable environment. An "intrinsically safe method" means that the energy available in the exhausted enclosure, or equivalent thereof, is below that necessary to ignite the fuel therein.

The flammable gas sensor of the present invention has two elements positioned in the exhausted enclosure 122: a heating element and a sensing element. The heating element is used to maintain the sensing element at a temperature optimal for sensing. The sensing element is highly sensitive to the flammable gas to be sensed. Two intrinsically safe barriers, which are preferably located in the electrical enclosure 125 (see, e.g., FIG. 5), are used to isolate the elements of the flammable gas sensor. For example, intrinsically safe barrier 1, e.g., a Zener diode, may be used to provide energy to the heating element while intrinsically safe barrier 2, e.g., a potentiometer isolator, may be used to monitor the resistance of the sensing element. The sensing element generates an analog signal that is proportional to the concentration of flammable gas detected.

Figure 5:
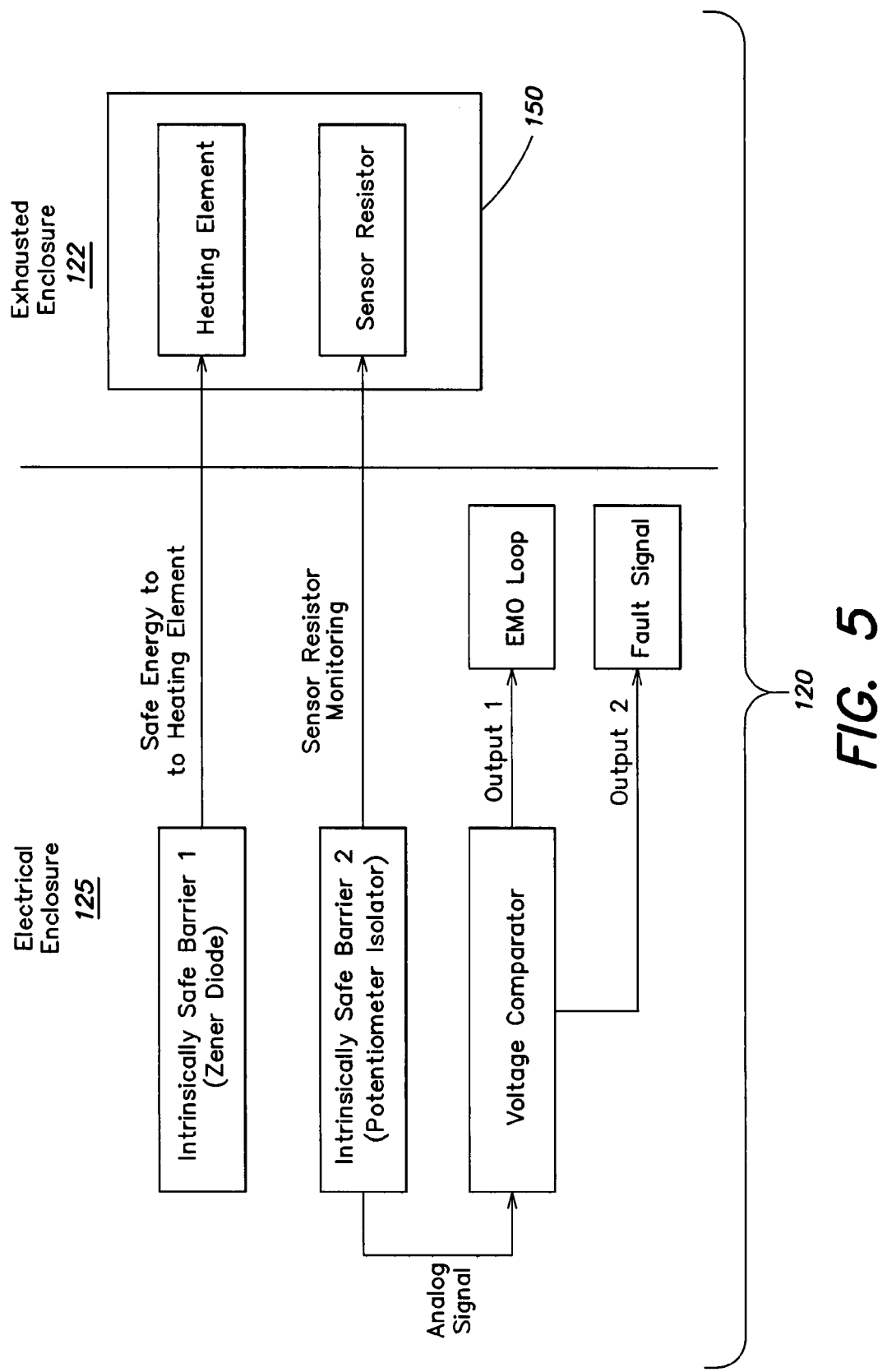
FIG. 5 is a schematic diagram of the components of the intrinsically safe flammable gas sensor according to the invention.

An embodiment of the electronic schematic of the flammable gas sensor of the present invention is illustrated in FIG. 5. The flammable gas sensor 150, including the heating element and the sensing element, is positioned within the exhausted enclosure 122 near the exhaust vent. Intrinsically safe barrier 1, for example a Zener diode, provides a low amount of energy to the heating element. Intrinsically safe barrier 2, for example a potentiometer isolator, monitors the resistance of the sensing element, wherein the measured resistance is proportional to the concentration of flammable gas. Intrinsically safe barrier 2 sends an analog signal to a voltage comparator.

If the concentration of flammable gas detected is determined to be too high, the emergency machine off (EMO) is activated. Emergency machine off (EMO) is a modality wherein all of the electrical components located inside the exhausted enclosure are shut-down immediately, including ignition sources, fuel flows, oxidizer flows, waste effluent flows, and water flows. Importantly, the threshold for EMO activation may correspond to the concentration necessary to ignite the fuel gas, however, preferably the threshold is less than one-quarter, preferably less than one-twentieth of said ignition concentration. For example, the threshold for methane gas detection and alarm may be set at 1000 ppm, which corresponds to a concentration $1/50^{th}$ of the concentration at which methane is readily ignited in air. Importantly, the chosen threshold should simultaneously be substantial enough to minimize background effects.

Similar to the flame sensor, the second output (fault condition) of the flammable gas sensor may be communicatively connected to the controller, and if a fault, e.g., a cable disconnection, is sensed, an alarm may sound, the fuel flow may be halted and a delayed shutdown is initiated. The flammable gas sensor is preferably on-line continuously.

The novel flammable gas sensor including at least two intrinsically safe barriers provides an affordable and compact improvement over fuel sensing devices of the prior art. Once installed, the exhausted enclosure may be safely monitored for fuel leaks because the flammable gas sensor, and its associated components, cannot be a source of ignition. It is to be appreciated by one skilled in the art that the intrinsically safe flammable gas sensor of the present invention having two intrinsically safe barriers may be utilized with any apparatus or method where the concentration of flammable fuels must be safely monitored.

In yet another embodiment of the present invention, the stability of the fuel flame is controlled to maintain stable combustion within the thermal reactor. In practice, fuel enters the thermal reaction chamber at burner jets 22 (see, e.g., FIG. 1). As the fuel egresses from the burner jet, it is ignited, releasing substantial quantities of heat. The high temperatures facilitate decomposition of the pollutants contained in the waste streams that enter the thermal reaction chamber 32. A significant problem associated with the thermal reactors of the prior art has been the maintenance of a stable combustion flame from these burner jets, said flame being readily affected by deficiencies in distribution of fuel in the manufacturing facility and changes in static pressure within the thermal reaction chamber. For example, the fuel line usually feeds other fabs within the facility and as such, distribution of fuel to the thermal reactor fluctuates over time. Changes in the quality of the flame affect the temperature achieved within the thermal reaction chamber which concomitantly affects the efficiency of decomposition of the waste stream therein. Prior art flame stabilizers are available, however they are very expensive. Therefore, it would be a significant advance in the art to economically maintain and control the performance of the thermal reactor by controlling the fuel feed pressure and hence the stability of the flame.

Figure 6:
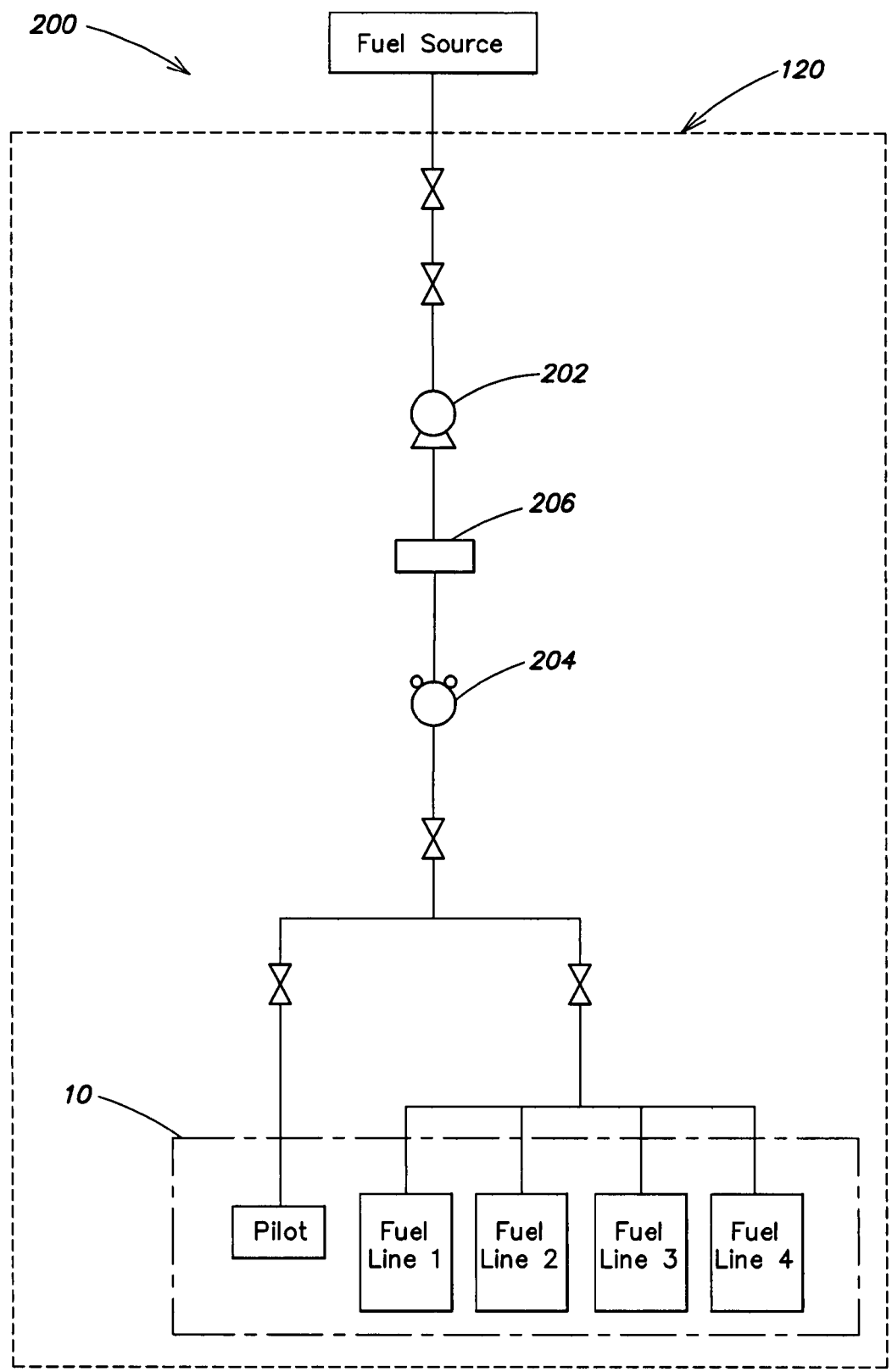
FIG. 6 is a schematic diagram of the components of the fuel booster circuit according to the invention.

Towards that end, an embodiment of a preferred fuel circuit 200 includes a fuel booster pump 202 positioned within the fuel circuit between the fuel source and the inlet adaptor 10 of the thermal reactor, wherein the fuel booster pump 202 boosts the pressure of the fuel (see, FIG. 6). In operation, the pump 202 draws in fuel from the fuel source (e.g., when fuel line pressure is low) or drives fuel downstream. Following passage through the pump 202, the fuel enters a meter 206. Preferably, the meter 206 is a mass flow meter (MFM), which measures the mass, or molar quantity, of gas flowing through it per unit time and provides a voltage output proportional to mass flow rate. Downstream of the meter 206 is a regulator 204, which steps down the pressure for passage to the pilot and fuel lines (each fuel line distributes fuel to at least one burner jet) and maintains a stable downstream pressure. Booster pumps contemplated herein include pumps powered pneumatically, electrically or hydraulically having a centrifugal, regenerative or diaphragm pumping means.

Typically, without a booster pump, the fuel is introduced to the burner jets at less than 1 psi and may continuously fluctuate. When the fuel booster pump is incorporated into the fuel circuit, the fuel pressure is boosted in a range of from about 1 psi to about 3psi and then stepped down at the regulator to less than 1 psi prior to passage through the burner jets. Importantly, in the latter embodiment, a stable and consistent fuel pressure flows from the burner jets and changes in exhaust draw and/or static pressure within the thermal reaction chamber do not readily affect the stability of the flame.

In addition to maintaining the flame stability in real time, the fuel booster pump, MFM and regulator may be communicatively connected to the controller whereby the pressure, and hence flow, of the fuel may be controlled to maintain a constant flow of fuel to the burner jets. For example, if the fuel line pressure upstream of the fuel booster pump is low, the rpm of the pump may be increased to draw in fuel from the fuel line. Analogously, if the fuel line pressure upstream of the fuel booster pump is high, the rpm of the pump may be decreased to drive fuel downstream. Importantly, the rpm of the booster pump should be controlled so that the pressure upstream of the regulator is always greater than the pressure downstream of the regulator.

In the alternative, when the pressure in the fuel line is high, e.g., greater than 15 psi, a mass flow controller (MFC) or needle valve may be substituted for the booster pump 202, and the MFM 206.

It is noted that a series of valves and other controllers may be situated between the fuel source and the burner jets, for example, pressure regulating valves, check valves, shut-off valves, isolation valves, over-pressure relief valves, mass-flow control valves, flashback arrestors, etc., as readily determined by one skilled in the art.

In a further embodiment of the present invention, a sequential mode of operation using at least two controllers for safety redundancy is disclosed for a thermal abatement reactor apparatus. It should be appreciated by one skilled in the art that the improved sequential mode of operation is not limited to thermal abatement reactors, but may be appropriately altered for use with other abatement tools.

Prior art thermal reactor controllers relied on hardware, e.g., relay boards, etc., for all safety interlocks. However, hardware interlocks require complicated electrical wiring and cannot be easily modified or applied to any other application.

The present invention overcomes the deficiencies of the prior art hardware interlocks by utilizing a control platform which includes at least two controllers to monitor and control all critical operations and processes of the components in the thermal reactor apparatus. The controllers are programmed to systematically follow a sequence of operations to verify that each particular component is working properly before proceeding to the next step of the sequence. The control platform sequentially monitors start-up of the thermal reactor and continues to monitor the reactor during abatement to ensure that a negative condition has not occurred.

If it is determined that a component is not operating properly during start-up, alarms and warnings will be enabled and start-up will be halted until the negative condition is cleared. If the control platform determines that a component is not operating properly during abatement, alarms and warnings will be enabled and the thermal reactor will be brought to a safe state, e.g., shut-off of fuel-flow, ignition sources, waste effluent, etc.

Surprisingly, the control platform disclosed herein enables an immediate hot shut-down of the thermal reactor without residual heat flux causing damage to the reactor apparatus downstream. In other words, immediately following a hot shut down, and rectification of the problem that triggered shut down of the apparatus, the thermal reactor may be restarted immediately. This design is a substantial improvement over previous generations of thermal abatement reactors, which frequently became unsafe or unusable for future operations following a hot shut down (e.g., due to an unplanned power outage or an emergency power off) because of thermal induced damage to downstream equipment. An immediate restart of the thermal reactor described herein is possible in part because the thermal reactor includes reticulated ceramic walls 34, which have a low thermal mass and may be continuously cooled during abatement by passing fluid, e.g., CDA, through the pores of the walls. Further, this improved thermal reactor design reduces preventive maintenance time (and costs) because the cool-down period is minimal.

As introduced in a foregoing paragraph, the control platform includes at least two controllers, preferably programmable controllers, to monitor and control all critical operations and processes of the components in the thermal reactor apparatus. As defined herein, "controllers" control at least one automated system and/or process. Proprietary software programs may be used to interface the controller to the automated system and/or process using transistors, switches, relays and other circuitry. Controller channel specifications include a total number of inputs and outputs. Contemplated inputs for a controller include, but are not limited to, DC, AC, analog, thermocouple, resistant thermal device (RTD), frequency or pulse, transistor and interrupts. Contemplated outputs for a controller include, but are not limited to, DC, AC, relay, analog, frequency or pulse, transistor and triac. Software programming languages commonly employed include, but are not limited to, IEC 61131-3, sequential function chart (SFC), function block diagram (FBD), ladder diagram (LD), structured text (ST), instruction list (IL), relay ladder logic (RLL), Flow Chart, C and BASIC.

The two controllers are preferably arranged to operate independently of one another to ensure proper operation of the thermal reactor apparatus. Controller 1 (hereinafter "CTRL1") is intended to monitor and control the start-up and operation of the apparatus and the Controller 2 (hereinafter "CTRL2") is designed to enable the critical items, including water flow, pilot flame operation, fuel flow and the circulation pump, during start-up and operation of the apparatus. If CTRL1 registers a component or operational failure, the control platform is directed through a specific holding pattern or full shut down depending on the component and stage of operation. If CTRL2 registers a component or operational failure, the control platform will not enable the operation of the component and the control platform will exit to critical alarms with a delayed shutdown. It should be appreciated that for the critical items, CTRL1 should identify that the component is non-operational. However, if CTRL1 fails to identify such non-operation, CTRL2 will provide the back-up check to halt start-up or continued operation.

Figure 7A:
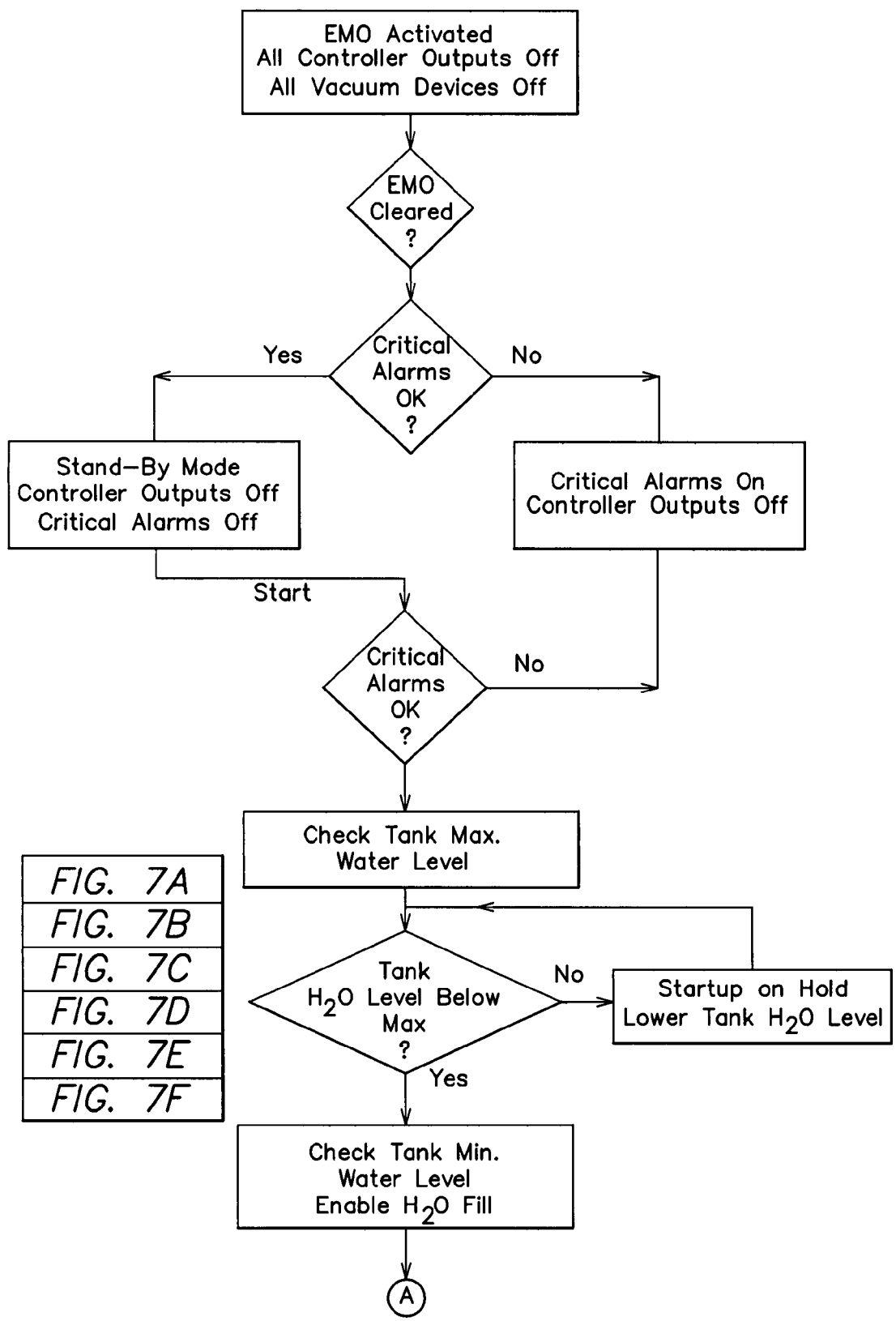
FIGS. 7A-7F represent a flow chart illustrating an embodiment of the control platform according to the invention.

Referring to FIGS. 7A-7F, a best mode of the control platform is disclosed. Referring to FIG. 7A, the start-up sequence includes verification that the EMO (emergency machine off) is properly activated, and that the critical alarms are functioning properly. The level of water in the circulation tank (see, e.g., FIG. 1, reference number 140) is checked to make sure it is not above the maximum allowed level. If the water level exceeds the maximum, the water level is appropriately adjusted. Importantly, the sequences disclosed in FIG. 7A are all monitored and controlled by CTRL1.

Figure 7B:
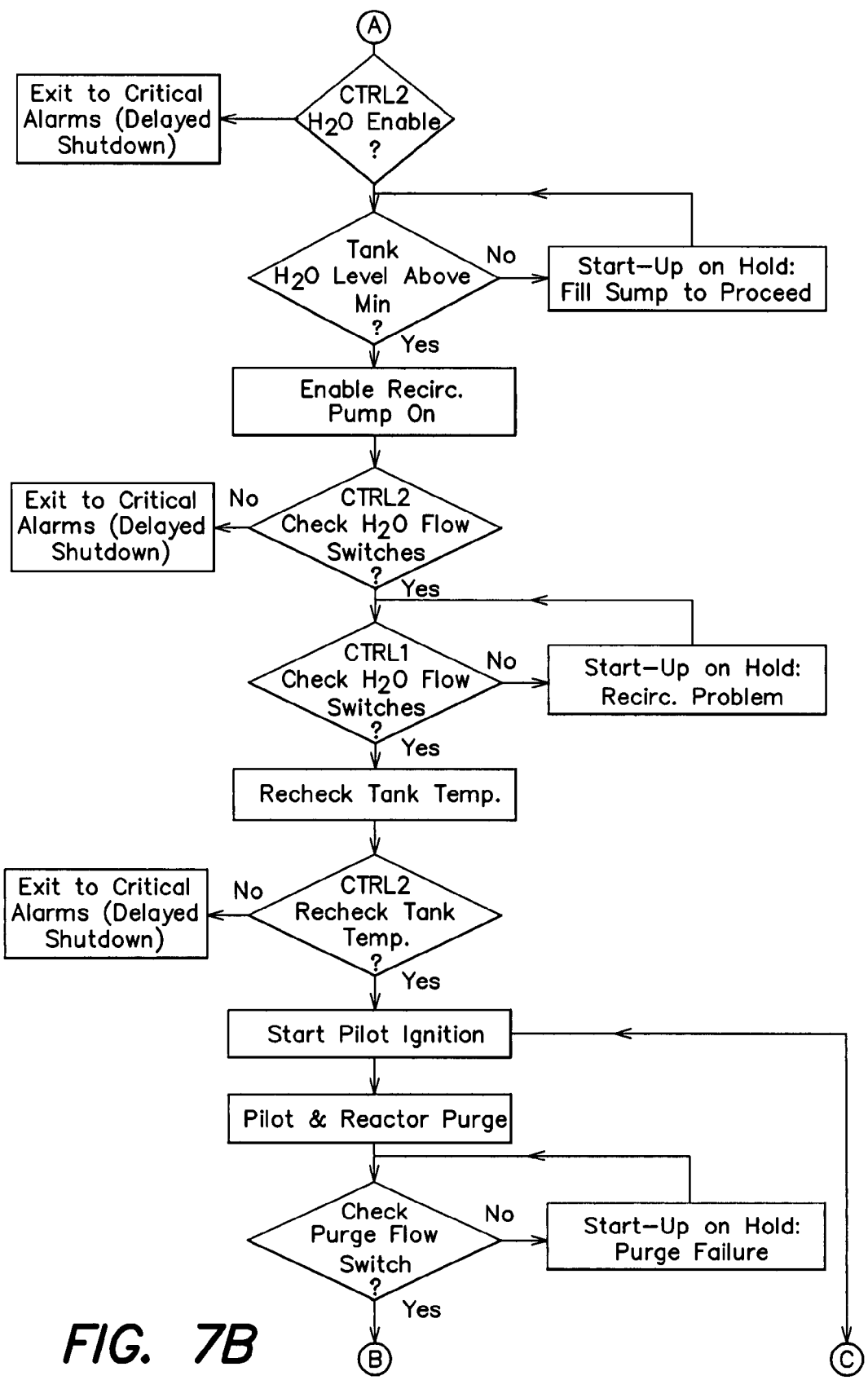

Referring to FIG. 7B, CTRL2 determines if the level of water in the circulation tank is above the minimum required amount and if not, enables water flow. Notably, if the water level is above the minimum required amount, CTRL2 will not enable water flow since it is not needed. CTRL1 then determines if the level of water in the circulation tank is above the minimum required amount. If it is not, the circulation tank is filled to above the minimum level. Importantly, the water would not be available to flow into the circulation tank if CTRL2 had not enabled water flow in the earlier step.

Once the level of water in the circulation tank is appropriate, water circulation is activated and water flow switches checked. The temperature of the headspace 145 in the circulation tank (see, e.g., FIG. 1) is then rechecked. If the headspace 145 temperature is greater than a pre-determined threshold value, e.g., in a range of from about 50° C. to about 80° C., preferably about 65° C., CTRL1 will not proceed to the next step. CTRL2 then rechecks the temperature of the headspace 145. Thereafter, pilot ignition is started. Prior to ignition, the reactor must be purged using an inert gas, such as nitrogen, to substantially remove any residual gases remaining following the most recent shut down of the reactor. This is especially important if the reactor was shut down using the EMO, whereby critical items such as fuel flow, waste effluent flow and the ignition, are immediately stopped because of a negative condition detected during start-up or operation. As defined herein, "substantially remove" means that at least 95%, preferably at least 99%, of the residual gases are removed during the purge. The reactor may be purged with about 50 standard liters to about 200 standard liters of inert gas, e.g., nitrogen, preferably about 100 standard liters of gas. The reactor is preferably purged with the appropriate amount of purge gas for a length of time appropriate to ensure at least 3 turnovers of gas within the reactor, preferably at least 5 turnovers.

Figure 7C:
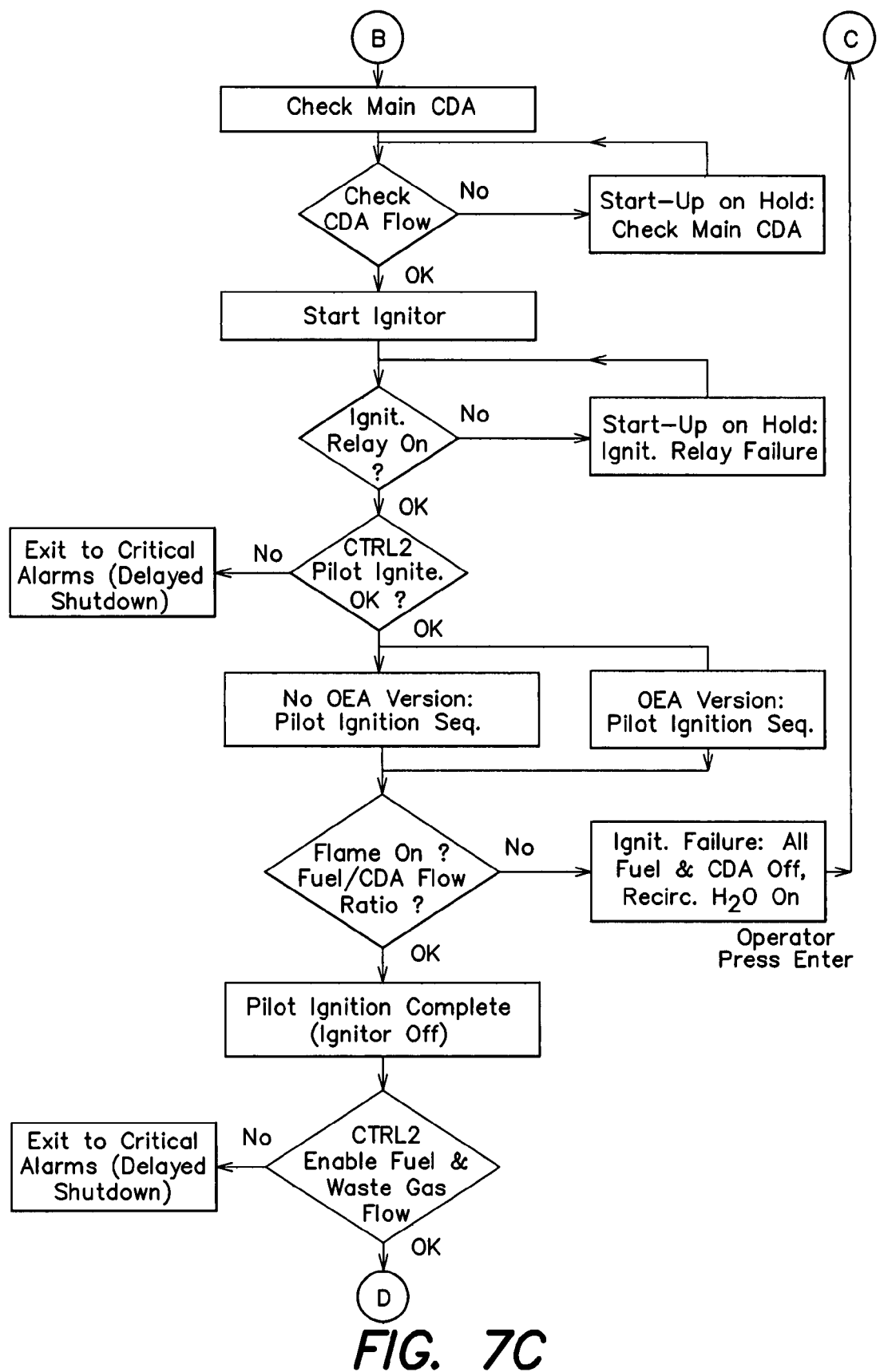

Referring to FIG. 7C, following a check of the CDA (clean dry air) flow, CTRL2 verifies that the pilot ignitor is ready for lighting, enabling ignition of the pilot. The configuration for ignition, as controlled by CTRL1, is dependent on whether the thermal reactor apparatus requires the use of oxygen enriched air (OEA) for the combustion process. Notably, ignition will not proceed without CTRL2 enablement of the pilot ignitor in the earlier step. Thereafter, the flame must be checked to verify ignition of the pilot, e.g., using the aforementioned flame sensor. Only after the pilot has been successfully ignited will CTRL2 enable fuel and waste stream flow. Importantly, CTRL2 does not actively turn on the flow of fuel and the waste stream to the appropriate inlets, but rather enables CTRL1 to turn on the flows when appropriate.

Figure 7D:
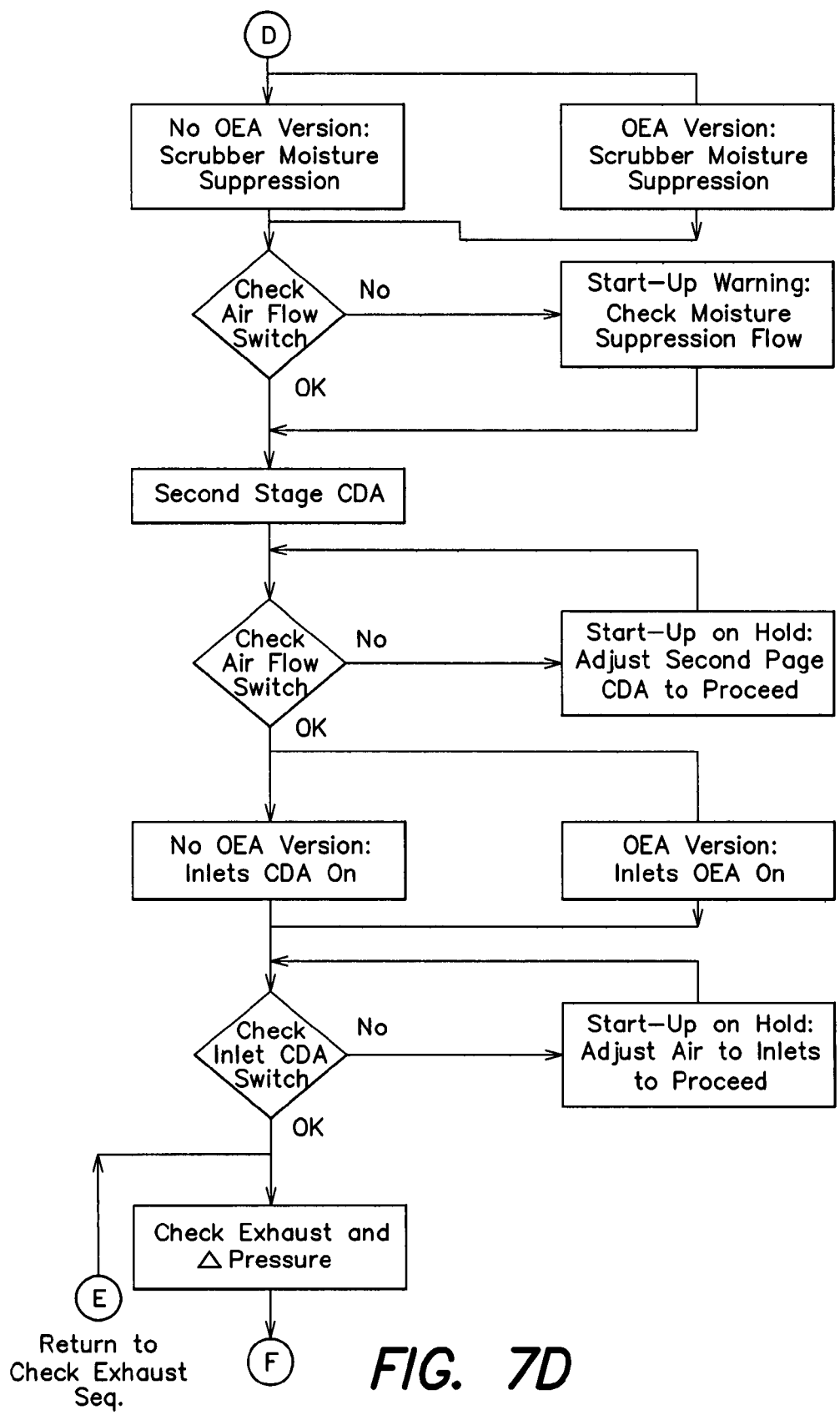

Referring to FIG. 7D, CTRL1 checks the moisture suppression associated with the downstream scrubbing means of the apparatus. Thereafter, the second stage and inlets CDA (or OEA) are checked. Importantly, at this stage of the sequence, the waste stream has not yet entered the thermal reactor for abatement therein. Prior to waste effluent introduction, the pressure of the exhaust egressing from the end-of-the-line must be compared relative to the pressure entering the thermal reactor to ascertain if the interior of the system is clogged, e.g., $SiO_2$ buildup at inlets, etc. Preferably, the pressure in should be approximately equal to pressure out, signaling that no significant clogging is present. For example, the change in pressure is preferably less than 2 inches of water, preferably in a range of from about 0.25 inches to about 0.50 inches.

Figure 7E:
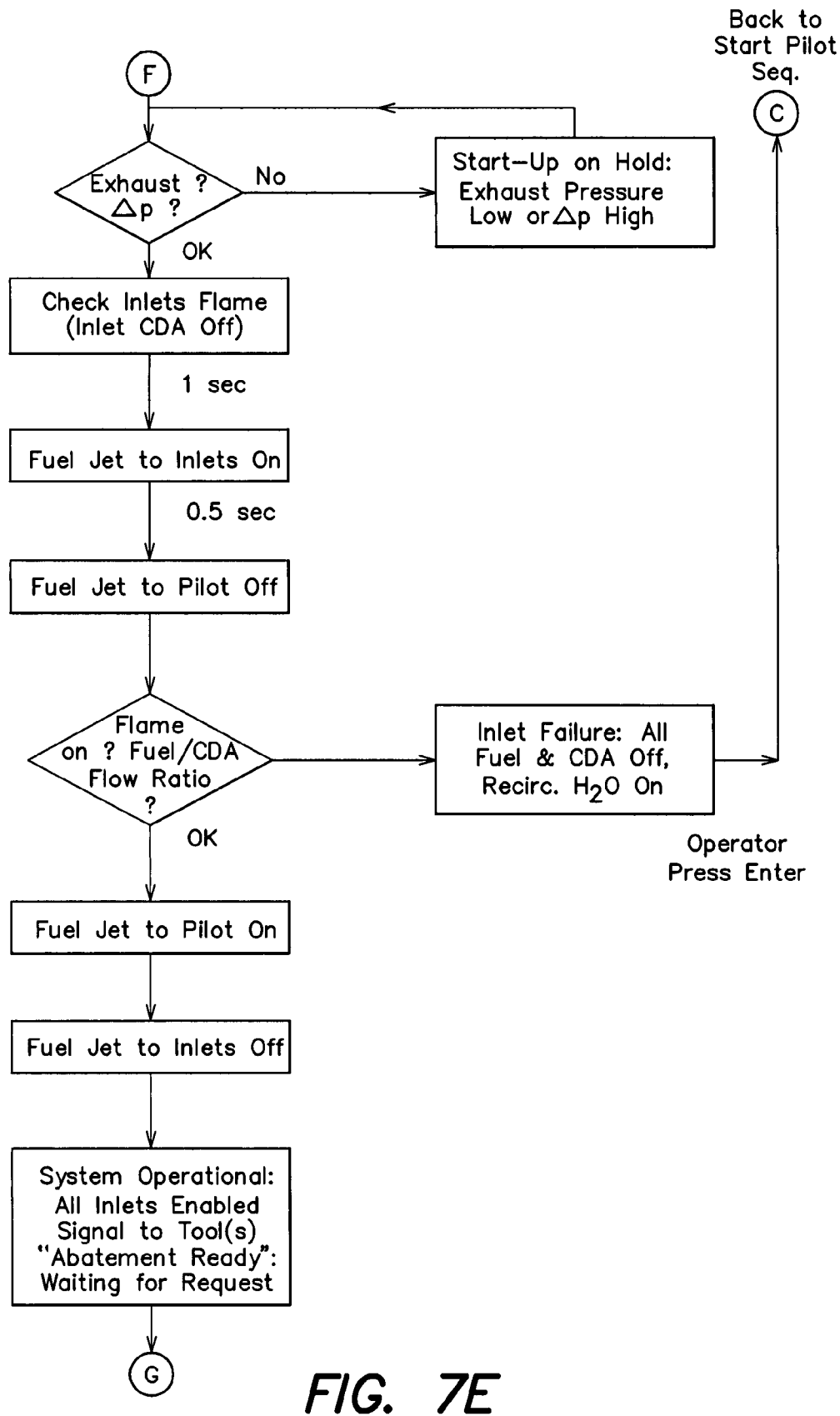

Referring to FIG. 7E, the burner jets are ignited and checked, e.g., using the flame sensor, to verify that the pilot flame properly ignited the burner jets. If the pilot fails to ignite the fuel flowing from the burner jets and/or the flames of the burner jets are extinguished thereafter, a potentially dangerous situation exists within the thermal reactor. This check is accomplished by igniting the burner jets, turning off the pilot flame and using the flame sensor to verify that a flame, e.g., the burner jet flame, is detected. At this stage, assuming all previous steps are positively verified, the pilot is reignited, the burner jets are extinguished and the system is ready to process waste effluent.

Figure 7F:
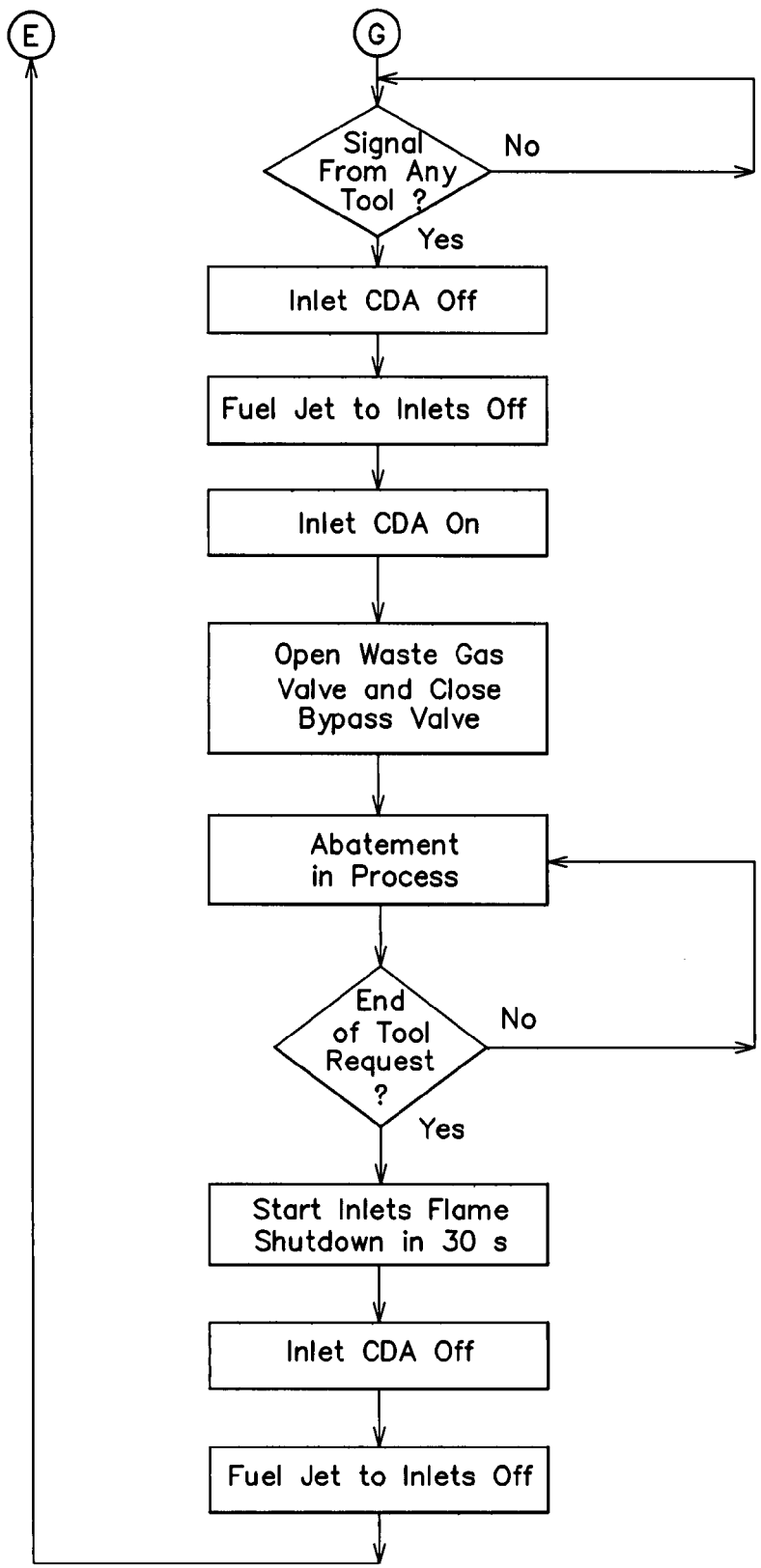

Referring to FIG. 7F, an upstream tool requests abatement, the burner jets are reignited and the waste stream from said tool is introduced into the thermal reactor for processing therein. Importantly, waste stream flow was previously enabled in the sequence by CTRL2 (see, e.g., FIG. 7C). The remaining sequence includes abatement and shut down, when requested. It is to be appreciated by one skilled in the art that the thermal abatement reactor described herein may abate waste streams discharged from multiple wafer process tools or backup alternate point-of-use abatement tools.

It is noted that many other checks/verifications may be incorporated into the process control sequence including, but not limited to, logic to maintain the water level in the circulation tank between a pre-determined maximum and minimum level, logic to monitor the operability of the flame sensor and logic to monitor the usage of all components of the thermal reactor to signal when preventive maintenance of a particular component is necessary.

The sequence of steps enumerated in FIGS. 7A-7F, ensure that the thermal reactor operates efficiently and safely. Safety redundancy is achieved by the utilization of two independent controllers, one controlling the thermal reactor startup and operation and the other enabling operation of critical items only.

In still another embodiment, the thermal abatement reactor is modified for smart abatement. Generally speaking, the embodiment quantifies the volume of waste effluent that will enter the thermal reactor over a given period of time. Prior to this invention, it was not possible to determine, in real-time, how much waste effluent was to be treated by the thermal reactor. Real-time information such as this would be highly advantageous because the critical items of the thermal reactor may be responsively adjusted to optimize abatement performance as well as lower operating costs.

An essential component of the smart abatement embodiment includes a detector system, for example the infrared thermopile (TPIR) detector disclosed in U.S. Pat. No. 6,617,175 issued Sep. 9, 2003 in the name of Jose Arno, which is incorporated by reference herein in its entirety. It is to be appreciated by one skilled in the art that the detector system is not limited to the TPIR, but may be any type of electromagnetic radiation detector available for the analysis required.

Figure 8:
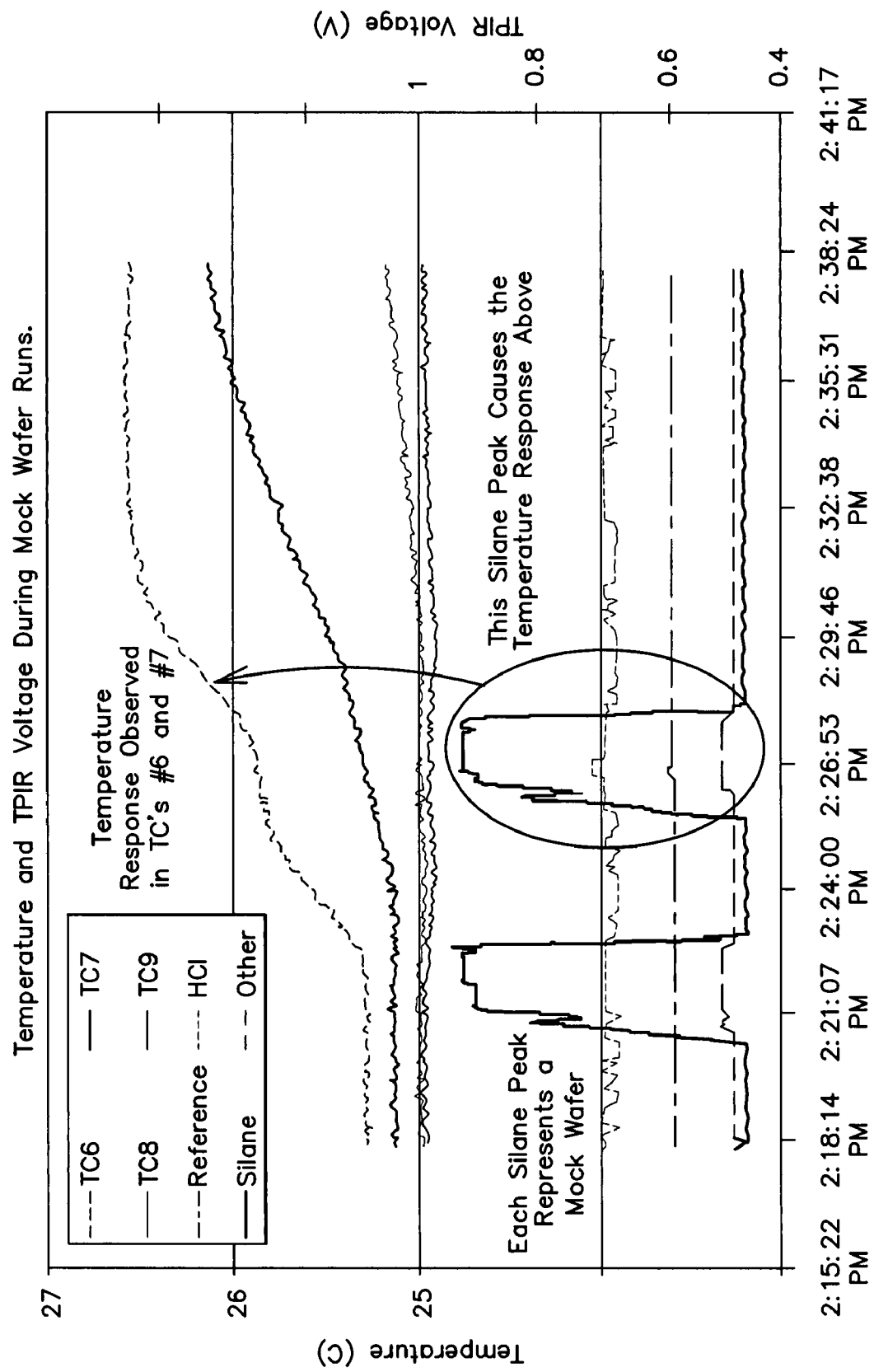
FIG. 8 illustrates the output of the infrared thermopile (TPIR) detecting system.

The TPIR output includes a square wave change (see, e.g., FIG. 8), wherein each square wave recorded indicates that one wafer has been processed. Thus, the total number of square waves equals the number of wafers processed. Knowing how much waste effluent is generated per wafer, and the total number of wafers processed, it is possible to calculate the total amount of waste effluent generated by an upstream process tool over time. The number of wafers processed is directly proportional to the amount of waste effluent generated and treated.

The detector system may be communicatively connected to a controller. In practice, the analytical signal generated by the TPIR or other analytical device is captured by the controller, which adjusts the operation of the thermal reactor accordingly. For example, the fuel flow and/or oxidant flow may be altered depending on the volume of waste effluent generated and preventative maintenance cycles may be scheduled based on number of wafers processed.

Specifically, the controller may be programmed to "count" wafers using appropriate logic that "counts" square waves. For example, the controller may be programmed to increment its "count" variable by 1 when the TPIR voltage output exceeds a certain value, e.g., about 0.25 V, for a specific period of time, e.g., 1 minute, and then drops to a specified baseline value.

Thus, the communication of the TPIR, or equivalent thereof, with a controller permits smart abatement whereby the thermal reactor may be adjusted in real-time to efficiently and safely abate waste effluent.

Although the invention has been variously described herein with reference to illustrative embodiments and features, it will be appreciated that the embodiments and features described hereinabove are not intended to limit the invention, and that other variations, modifications and other embodiments will readily suggest themselves to those of ordinary skill in the art, based on the disclosure herein. The invention therefore is to be broadly construed, consistent with the claims hereafter set forth.

That which is claimed is:

1. A system comprising:
   a controller;
   a thermal abatement reaction chamber adapted to be controlled by the controller;
   a conduit into the thermal abatement reaction chamber;
   a pilot flame device disposed at a first end of the conduit within the thermal abatement reaction chamber;
   an ultraviolet light sensor disposed at a second end of the conduit outside of the thermal abatement reaction chamber, coupled to the controller, and adapted to provide an indication to the controller whether the pilot flame device is lit; and
   an actuator operable to open and close the conduit.

2. The system of claim 1 wherein the controller is adapted to operate the thermal abatement reaction chamber based on the indication from the sensor.

3. The system of claim 1 wherein the actuator is adapted to prevent radiation from the flame from reaching the sensor when the conduit is closed.

4. The system of claim 1 wherein the actuator is adapted to cycle the conduit between an open state and a closed state.

5. The system of claim 4 wherein the controller is adapted to test the sensor by comparing an actual state of the conduit with the indication from the sensor.

6. The system of claim 5 wherein the actuator is adapted to cycle the conduit between an open state and a closed state at a defined rate known to the controller.

7. The system of claim 1 wherein
   the thermal abatement reaction chamber includes burner jets adapted to provide fuel to the thermal abatement reaction chamber and to be ignited by the pilot flame device, and
   wherein the sensor is further adapted to provide an indication to the controller whether the burner jets are ignited.

8. The system of claim 7 wherein the controller is adapted to shut down the thermal abatement reaction chamber based on whether the burner jets are ignited.

9. A system comprising:
a first enclosure including a thermal abatement reaction chamber;
a second enclosure associated with the first enclosure;
a sensor within the first enclosure and adapted to detect flammable gas within the first enclosure;
a heater within the first enclosure and adapted to maintain the sensor at a defined temperature;
a first barrier within the second enclosure, coupled to the sensor, and adapted to limit an amount of energy provided to the sensor to a level below a flammable gas ignition energy level; and
a second barrier within the second enclosure, coupled to the heater, and adapted to limit an amount of energy provided to the heater to a level below the flammable gas ignition energy level.

10. The system of claim 9 further comprising:
a controller adapted to receive a signal from the first barrier and to shut down the thermal abatement reaction chamber if the signal indicates that a concentration level of flammable gas exceeds a defined threshold.

11. The system of claim 10 wherein the controller includes a voltage comparator.

12. The system of claim 9 wherein the first enclosure includes an exhaust vent.

13. The system of claim 12 wherein the sensor is disposed proximate to the exhaust vent.

14. The system of claim 9 wherein the second enclosure is purged filled with an inert gas.

15. The system of claim 9 wherein the sensor includes a thermal resistance sensor.

16. The system of claim 9 wherein the first barrier includes a potentiometer isolator.

17. The system of claim 9 wherein the second barrier includes a Zener diode.

18. The system of claim 9 further comprising a third enclosure containing the first and second enclosures.

19. A system comprising:
a first enclosure including a thermal abatement reaction chamber;
a second enclosure associated with the first enclosure;
a sensor within the first enclosure and adapted to detect flammable gas within the first enclosure;
a barrier within the second enclosure, coupled to the sensor, and adapted to limit an amount of energy provided to the sensor to a level below a flammable gas ignition energy level; and
a controller adapted to receive a signal from the barrier and to shut down the thermal abatement reaction chamber if the signal indicates that a concentration level of flammable gas exceeds a defined threshold.

20. A system comprising:
a shared fuel source;
a fuel circuit coupled to the shared fuel source and adapted to provide a stable flow of fuel, wherein the fuel circuit includes:
a meter to determine an amount of pressure within the fuel circuit,
a pump to create pressure within the fuel circuit, and
a regulator to adjust the fuel pressure to a defined pressure; and
an inlet adaptor coupled to the fuel circuit and adapted to receive fuel and to supply the fuel to a thermal abatement reaction chamber.

21. The system of claim 20 wherein the fuel circuit further includes a controller coupled to at least one of the meter, pump, and regulator, and adapted to control at least one of the pump and regulator based on a signal from the meter.

22. The system of claim 20 wherein the shared fuel source is adapted to supply fuel to a plurality of systems.

23. The system of claim 20 wherein the meter is a mass flow meter adapted to provide a signal indicative of a quantity and a rate of fuel flowing through the fuel circuit.

24. The system of claim 20 wherein the pump includes a fuel booster pump adapted to draw fuel from the shared fuel source.

25. The system of claim 20 wherein the pump includes a compressor adapted to pressurize fuel within the fuel circuit.

26. The system of claim 20 wherein the regulator includes a pressure regulator adapted reduce the pressure of fuel supplied from the shared fuel source down to the defined pressure.

27. The system of claim 20 wherein the regulator includes a pressure regulator adapted to provide fuel to the inlet adaptor at the defined pressure.

28. An apparatus comprising:
a fuel circuit coupled to a shared fuel source and adapted to provide a stable flow of fuel, wherein the fuel circuit includes:
a meter to determine an amount of pressure within the fuel circuit,
a pump to create pressure within the fuel circuit, and
a regulator to adjust the fuel pressure to a defined pressure.

29. A system comprising:
an abatement system including a thermal reaction unit;
a first controller adapted to monitor components of the thermal reaction unit; and
a second controller adapted to monitor components of the thermal reaction unit independently of the first controller,
wherein the second controller is further adapted to enable the monitored components for operation by the first controller if one or more defined operating conditions are verifiable by the second controller, and
wherein the first controller is further adapted to operate the monitored components if the defined operating conditions are verifiable by the first controller and the second controller has enabled for operation the monitored components.

30. The system of claim 29 wherein the monitored components include an emergency machine off component.

31. The system of claim 29 wherein the monitored components include a circulation tank and an associated water flow component.

32. The system of claim 29 wherein the monitored components include a pilot flame device igniter and an associated air flow component.

33. The system of claim 29 wherein the monitored components include a pilot flame sensor and an associated fuel and waste stream flow component.

34. The system of claim 29 wherein the first and second controllers follow a predefined sequence to start operation of the thermal reaction unit.

35. The system of claim 34 wherein the predefined sequence includes:
(a) verifying operability of an emergency shutdown system using the first controller;
(b) re-verifying operability of the emergency shutdown system and enabling the first controller to proceed with system start-up, using the second controller;
(c) proceeding with system start-up using the first controller;

(d) verifying a volume of recirculation water in a water circulation tank positioned downstream of the thermal reaction unit using the first controller;
(e) re-verifying the volume of recirculation water and enabling the first controller to flow water into the water circulation tank if the volume of recirculation water is below a minimum volume, using the second controller;
(f) filling the water circulation tank to a level above the minimum volume if the volume of recirculation water is below the minimum volume using the first controller;
(g) proceeding with system start-up using the first controller;
(h) verifying a temperature in a headspace of the water circulation tank is below a threshold temperature prior to start-up using the first controller;
(i) re-verifying the temperature in a headspace is below the threshold temperature and enabling the first controller to proceed with system start-up, using the second controller;
(j) proceeding with system start-up using the first controller;
(k) purging the thermal reaction unit with an inert gas for sufficient time to substantially remove flammable species that may be present using the first controller;
(l) verifying clean dry air (CDA) flow using the first controller;
(m) re-verifying CDA flow using the second controller and enabling the first controller to ignite a pilot flame device positioned within the thermal reaction unit, using the second controller;
(n) igniting the pilot flame device using the first controller;
(o) verifying ignition of the pilot flame device using the first controller;
(p) re-verifying ignition of the pilot flame device and enabling the first controller to flow fuel flow, using the second controller;
(q) flowing fuel into the thermal reaction unit using the first controller;
(r) igniting the fuel flowing into the thermal reaction unit via the pilot flame device;
(s) verifying that the pilot flame device has ignited the fuel flowing into the thermal reaction unit using the first controller;
(t) re-verifying that the pilot flame device has ignited the fuel flowing into the thermal reaction unit and enabling the first controller to flow a waste effluent into the thermal reaction unit, using the second controller; and
(u) flowing the waste effluent into the thermal reaction unit for at least partial decomposition using the first controller.

* * * * *